(12) United States Patent
Nakajima et al.

(10) Patent No.: US 8,260,615 B1
(45) Date of Patent: Sep. 4, 2012

(54) CROSS-LINGUAL INITIALIZATION OF LANGUAGE MODELS

(75) Inventors: Kaisuke Nakajima, San Jose, CA (US); Brian Strope, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/093,176

(22) Filed: Apr. 25, 2011

(51) Int. Cl.
G06F 17/28 (2006.01)

(52) U.S. Cl. .......................................... 704/257; 704/2

(58) Field of Classification Search .................. 704/257, 704/235, 277, 1–10
See application file for complete search history.

(56) References Cited

U.S. PATENT DOCUMENTS

| | | | |
|---|---|---|---|
| 7,113,903 B1 * | 9/2006 | Riccardi et al. ................... | 704/4 |
| 2005/0228640 A1 * | 10/2005 | Aue et al. .......................... | 704/9 |
| 2006/0009963 A1 * | 1/2006 | Gaussier et al. .................. | 704/7 |
| 2006/0136226 A1 * | 6/2006 | Emam ........................... | 704/277 |
| 2007/0271088 A1 * | 11/2007 | Waibel et al. ..................... | 704/9 |
| 2009/0083023 A1 * | 3/2009 | Foster et al. ...................... | 704/3 |
| 2009/0326911 A1 * | 12/2009 | Menezes et al. .................. | 704/2 |
| 2011/0022380 A1 * | 1/2011 | Zaslavskiy et al. ............... | 704/4 |

* cited by examiner

Primary Examiner — Abul Azad
(74) Attorney, Agent, or Firm — Fish & Richardson P.C.

(57) ABSTRACT

Methods, systems, and apparatus, including computer programs encoded on a computer storage medium, for initializing language models for automatic speech recognition. In one aspect, a method includes receiving logged speech recognition results from an existing corpus that is specific to a given language and a target context, generating a target corpus by machine-translating the logged speech recognition results from the given language to a different, target language, and estimating a language model that is specific to the different, target language and the same, target context, using the target corpus.

18 Claims, 3 Drawing Sheets

Example Corpus

I
love
new
york
hello
hi
goodbye
york
LOL
hi
I love new york
why are you late
I love newark
I love new work
I love new york
why are you late
I hate new work
why are you late
I love new york
when are you coming
where are you
coming home
I love new york
why are you late
hi
why are you late

302

Example Language Model why are you late (.004)
I love new york: (.003)
I love new work: (.001)
I love newark: (.001)
I hate new work: (.001)
.
.
.
where are you: (.001)

CROSS-LINGUAL INITIALIZATION OF LANGUAGE MODELS

BACKGROUND

Automated Speech Recognition ("ASR") engines convert speech to text. In doing so, ASR engines typically rely on acoustic models that map the sounds of each utterance to candidate words or phrases, and language models that specify which of these candidate words or phrases are more likely to be correct based on historical uses of the words or phrases.

To improve recognition accuracy, ASR engines may use different acoustic models and language models to recognize utterances that are associated with different contexts. For example, one language model may be used to recognize utterances that are spoken when a user is entering a text message, and a different language model may be used when the user is entering search terms.

In general, each language model is typically built using a corpus of words or phrases that have been collected by the ASR engine or another system over time. For instance, context-specific language models may be estimated from logs of previous speech recognition results or logs of previous text input from multiple users in similar contexts. The words or phrases in a particular corpus may include words or phrases that have been explicitly provided by the user, or candidate transcriptions that have been recognized by an ASR engine.

If a language model that is developed for a given language and a particular context is used to recognize utterances that are spoken in a different context, an ASR engine may generate inaccurate recognition results. Accordingly, to increase recognition accuracy, an ASR engine should use a language model that is appropriate to both the language of the utterances as well as to the context in which the utterances were spoken. For certain infrequently used languages, or for infrequently occurring contexts, an ASR engine may not have access to an appropriate language model.

SUMMARY

When a target corpus or language model that is specific to both a target language and a target context is either not available or not acceptable, the target corpus may be generated and the target language model may be estimated using logged recognition results from an existing corpus that has already been generated for a different language. Specifically, and in accordance with one innovative aspect of the subject matter described in this disclosure, estimating a new, target language model is performed using a method that includes machine-translating an existing corpus that is associated with a target context and a given language, or logged speech recognition results from the existing corpus, to generate a machine-translated corpus that is associated with the same, target context but a different, target language.

A new, target language model that is specific to the target language and the target context may be estimated using the machine-translated corpus, e.g., using a process that counts a relative frequency of occurrence for each word or phrase in the machine-translated corpus. If a target corpus in the target language and target context already exists but is inadequate, the target language model may be estimated using both the machine-translated corpus and the existing target corpus. An ASR engine may use the new, estimated target language model to transcribe utterances that are associated with the target language and target context.

According to another innovative aspect of the subject matter described in this disclosure, a method includes receiving logged speech recognition results from an existing corpus that is specific to a given language and a target context. A target corpus is generated by machine-translating the logged speech recognition results from the given language to a different, target language. A language model that is specific to the different, target language and the same, target context is estimated using the target corpus.

These and other implementations may each optionally include one or more of the following features. In various examples, estimating the language model comprises counting each occurrence of each distinctive word or phrase in the target corpus and determining a relative frequency of occurrence of each distinctive word or phrase in the target corpus, from among all distinctive words or phrases in the target corpus. The target context is associated with a particular application or application state, operating system, geographic location or region, or environmental or ambient characteristic. In some instances, the target context is a text messaging context, an e-mail context, a search query context, a voice-dialing context, or a navigation context.

In some examples, generating the target corpus comprises filtering the speech recognition results, then machine-translating only the filtered speech recognition results. Filtering the speech recognition results comprises filtering the speech recognition results that are associated with a speech recognition confidence score that is below a predefined threshold or filtering the speech recognition results that represent abbreviations. In certain instances, generating the target corpus comprises machine-translating the speech recognition results of the existing corpus in real time as the speech recognition results are received. Generating the target corpus further comprises including the machine-translated speech recognition results and an existing, partial corpus specific to the target language and the target context in the target corpus. Generating the target corpus also comprises translating logged text data of the existing corpus in the given language to the different, target language and including translation results of the logged text data in the target corpus.

Other embodiments of these aspects include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3 is a diagram of an example corpus and an example language model.

Like reference numbers represent corresponding parts throughout.

DETAILED DESCRIPTION

Figure 1:
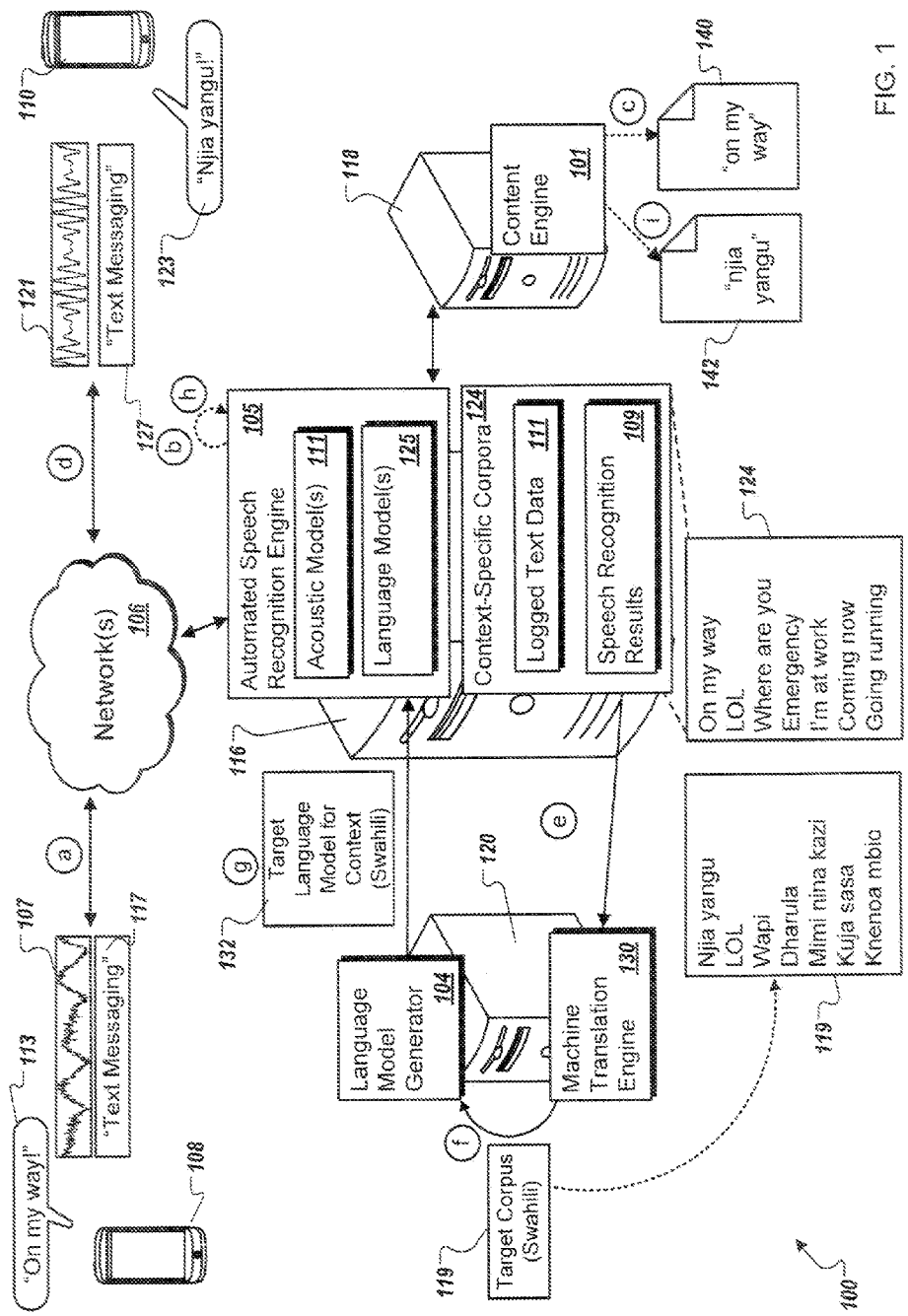
FIG. 1 is a diagram of an example system that machine-translates existing corpora, to estimate language models for target languages and contexts.

FIG. 1 is a diagram of an example system 100 that machine-translates existing corpora or logged recognition results associated with each corpora, to estimate language models for target languages and contexts. Briefly, the system 100 identifies an existing corpus that includes speech recognition results for a given language and a target context. A target corpus may be generated by machine-translating the speech recognition results of the existing corpus from the given language into a different language, and optionally blended the machine-translated speech recognition results with other data sources for the target language. The target corpus may then be used to estimate a language model specific to the different language and the same, target context.

The system 100 includes client devices 108 and 110, e.g., cellular telephones, PDAs, e-book readers, smart phones, music players, or personal computers. The client devices 108 and 110 are configured to communicate with servers 116, 118 and 120, which collectively make up an ASR system, to obtain speech recognition results for utterances that are spoken by the respective users of the client devices 108 and 110.

One or more servers 116 may be communicably coupled to one or more servers 118 and 120. Collectively, the servers 116, 118 and 120 generate new, target language models that are specific to target languages and contexts, using existing corpora that are specific to different languages but the same or similar contexts, and transcribe utterances using the new, target language models. The one or more servers 118 may be a search engine, a dictation engine, a dialogue system, or any other engine or system that uses transcribed utterances, or that invokes a software application that uses transcribed utterances to perform some action.

The networks 106 may include a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof.

FIG. 1 also depicts both a flow of data during various states among client devices 108 and 110, and servers 116, 118, and 120, when an example process for estimating new language models is performed by the system 100. The states (a) to (i) may occur in the illustrated sequence, or they may occur in a sequence that is different than the illustrated sequence.

The ASR engine 105 uses the acoustic models 111 and the language models 125 to transcribe utterances. Each of the language models 125 may include a list of distinct words or phrases in a given language and, for each distinct word or phrase, may specify a likelihood of occurrence of the word or phrase. The context-specific language models among the language models 125 may specify a likelihood that each word or phrase occurs in a particular, target context. The likelihood that a particular word or phrase occurs in a target context may be based on historical data obtained from previous uses of the word or phrase relative to the frequency of use of all other words or phrases in the same context.

The likelihood of each word or phrase occurring in a target context may be expressed, for example, as a quantity. The quantity may be a value that reflects a number of times a word or phrase occurs, has occurred, will occur, or is predicted to occur in a corpus for the given language and, for context-specific language models, for a target context.

Alternatively, the likelihood may be expressed as a percentage. This percentage may be expressed as a value that reflects, for example, a fraction of all words or phrases in a corpus in which the word or phrase occurs, has occurred, will occur, or is predicted to occur in the corpus. Words or phrases that, according to the semantic or grammar rules of a given language, are semantically or grammatically incorrect, may be associated with a lower likelihood. Words or phrases that, according to the semantic or grammar rules of the given language, are semantically or grammatically correct, may be associated with a higher likelihood. In some instances, however, the likelihood that a particular word or phrase occurs in a particular context depends on the frequency of previous uses of the word or phrase, regardless of the semantic or grammatical accuracy of the word or phrase.

One example of a context-specific language model is a text messaging language model that is used to transcribe utterances that are spoken as input to a text messaging application. The text messaging language model may be generated using a corpus (e.g., text messaging corpus 124), which may be a list or a log of words or phrases that have been previously submitted by other users that have sent text messages. The corpus may include logged speech recognition data 109, such as speech recognition results for voice-recorded text messages, or logged text data 111 received as traditional, incoming text messages.

In addition to the text messaging language model, the ASR engine 105 may have access to other context-specific language models, such as language models associated with an e-mail context, a search query context, a voice-dialing context, a navigation context, an application-specific or application state-specific context, an operating system-specific context, a default context, a geographic location- or region-specific context, an environmental- or ambient characteristic-specific context, or other contexts. The likelihoods associated with each word or phrase in the language model that is specific to one context may differ from the likelihoods associated with the same words or phrases in a language model that is specific to another, different context, or with a default language model that is not specific to any particular context.

As shown in states (a) to (c) of FIG. 1, in the situation where an acceptable corpus or language model is available for a given language and a target context, the language model is used to transcribe utterances that are associated with the given language and the target context. For instance, when an audio signal that encodes utterances that are associated with the given language is received, the utterances encoded in the audio signal may be transcribed at the ASR engine 105 using the language model that is specific to the given language and target context.

In FIG. 1, the ASR engine 105 receives, during state (a), an audio signal 107 from a client device 108. The audio signal 107 encodes the utterance 113, which represents a common text message, i.e., the English-language phrase, "on my way."

The audio signal 107 is generated when the user of client device 108 speaks the utterance 113 into a microphone of the client device 108. The client device 108 determines a context associated with the utterance 113, i.e., "text messaging," and generates metadata 117 that is communicated with the audio signal 107 to the ASR engine 105. In other implementations, the metadata 117 is generated at the ASR engine 105 instead of at the client device 108, or the ASR engine 105 generates the metadata 117 with the assistance of the client device 108.

The client device 108 or the ASR engine 105 may determine the context associated with an utterance by evaluating the applications that are executing on the client device 108 at a time when the utterance 113 was spoken, by identifying a location of the client device 108 when the utterance 113 was spoken, by analyzing sampled ambient audio, or by receiving an explicit user input that identifies a context. In other example implementations, the client device 108 or the ASR engine 105 may determine the context by determining a state of the applications that are executing on the client device 108, by using a default context, by using a previously used or last used context, or through other approaches.

In addition to or instead of identifying the context associated with the utterance 113, the metadata 117 may include any other information associated with the client device 108, the user of the client device 108, the audio signal 107, or the utterance 113. For example, if the user opts to allow the client device 108 to provide such information, the metadata 117 may specify the geographic location of the client device 108, demographic information associated with the user of client device 108, information that the user of the client device 108 has manually entered, or information included in a user profile. Generally, such information may be used by the ASR engine 105 to improve recognition results or, more specifically, may be used to identify a context associated with the utterance 113.

During state (b), the audio signal 107 and the metadata 117 that identifies the context are received at server 116. During state (c), the ASR engine 105 transcribes the utterance 113 using one or more of the acoustic models 111, and using one or more of the language models 125 that are specific to the language of the utterance 113 and the context identified in the metadata 117. The ASR engine 105 further generates a candidate transcription 140, i.e., the English-language phrase "on my way," and provides the candidate transcription 140 to the server 118.

As shown in states (d) through (i), if the ASR engine 105 does not have access to a corpus or language model for a target language and a target context, or if the corpus or language model for the different language and the target context is insufficient or unacceptable, the ASR engine 105 may estimate a new language model for the different language and context using speech recognition results 109 of an existing corpus 124. Insufficiency or unacceptability of a language model may be measured by evaluating a speech recognition confidence score, by determining an extent to which a user or a group of users have used speech recognition results, or by using other approaches.

During state (d), a user of client device 110 may speak the utterance 123 into a microphone of the client device 110 while attempting to send a text message. In FIG. 1, the utterance 123, i.e., "njia yangu," is illustrative of the Swahili expression for the English-language phrase "on my way." The utterance 123 is encoded in an audio signal 121, and the context, i.e. "text messaging," is determined and encoded in metadata 127. The audio signal 121 and the metadata 127 are communicated from the client device 110 to the ASR engine 105 through network 106.

Because no Swahili-language corpus or language model is available for the target, text messaging context at the ASR engine 105, a new corpus may be generated based on the logged speech recognition results 109 of existing, English-language corpus 124 for the same context. In addition, or alternatively, the new corpus may also be generated based on logs of previous text inputs 111 for the same context. During state (e), the speech recognition results 109 and/or logged text data 11 are communicated to a machine translation engine 130, which may be located at a server 120 that is different from server 116, as depicted in FIG. 1, or at the server 116.

During state (f), the machine translation engine 130 performs an automated, direct translation of the words or phrases of the speech recognition results 109 and/or the logged text data 111 of the existing corpus 124, from the English language into the Swahili language, outputting a Swahili-language target corpus 119 that includes machine-translated words and phrases that correspond to the same, target context. For example, the machine translation engine 130 machine-translates the English-language phrase "on my way" from the existing corpus 124 into the Swahili language, and populates the target corpus 119 with the corresponding, Swahili-language phrase "njia yangu."

In some instances, the machine translation engine 130 may filter the speech recognition results 109 of the existing corpus 124 before the speech recognition results 109 are machine-translated into the target corpus 119. In doing so, not every word or phrase in the speech recognition results 109 may be translated and included in the target corpus 119. For example, various signals may be used to filter out words or phrases in the existing corpus with low confidence or quality scores.

Additionally, various signals may cause the ASR engine 105 to filter words or phrases that were previously not selected by prior users of the ASR engine 105, that were identified by the prior users as incorrect transcriptions, or other words. Abbreviations or other terms that are not words or phrases may similarly not be machine-translated.

In certain instances, words or phrases associated with a low quality acoustic model score or language model score, or with a low overall recognition confidence score that represents an aggregated acoustic model score and language model score, may be excluded from machine translation. Entries in the speech recognition results having a confidence score below a threshold level may be automatically excluded from machine translation.

Furthermore, instead of machine-translating an entire existing corpus at once, machine translation may be performed iteratively, in phases or in real-time as additional speech recognition results are added to the existing corpus 124. For example, machine translation of words or phrases from the speech recognition results 109 of the existing corpus 124 may occur each time a new or distinct word or phrase is added to the existing corpus 124 based on completed speech recognition events. If a particular word or phrase has already been machine-translated and added to the target corpus 119, an instance count associated with the particular word or phrase in the target corpus 119 may be incremented instead of re-translating the same particular word or phrase.

During state (g), after machine-translating the existing, English-language speech recognition results 109, the machine translation engine 130 transmits the Swahili-language, target corpus 119 to a language model generator 104. The language model generator 104 generates a context-specific, Swahili-language, target language model 132 using the machine-translated, target corpus 119. In instances where a target corpus in the Swahili language for the target context already exists but may be incomplete or insufficient, the language model generator 104 may use the received target corpus 119 based on translation results of the machine translation engine 130 to augment the existing but inadequate target corpus and generate the target language model 132 based on the combined, augmented corpus.

The target language model 132 generated by the language model generator 104 includes the machine-translated list of distinct words or phrases in the Swahili language and, for each distinct word or phrase, a likelihood of occurrence of the word or phrase. The likelihood of each word or phrase occurring in a target context may be expressed, for example, as a quantity that reflects a number of times a word or phrase occurs in the machine-translated, Swahili-language, target corpus 119. Alternatively, the likelihood may be expressed as a percentage that reflects, for example, a fraction of all words or phrases in the Swahili-language, target corpus 119 in which the word or phrase occurs.

In the example of FIG. 1, the target language model 132 includes a probability of an occurrence of each word or phrase in the target corpus 119. For example, the target language model 132 may indicate that the phrase "njia yangu" occurs one hundred times in the target corpus 119. The number of occurrences of "njia yangu" relative to occurrences of other words or phrases in the target corpus 119 may reflect the likelihood that a particular set of words derived from received audio signals is actually the phrase "njia yangu," instead of another, similarly sounding phrase.

The target language model 132 is sent to the ASR engine 105 to be used for transcribing audio signals associated with the Swahili language, and the text messaging context. During state (h), the ASR engine 105 uses the target language model to transcribe the utterance 123 and, during state (i), outputs the candidate transcription 142 to the content engine 101.

By estimating the target language model 132 using speech recognition results 109 of the existing corpus 124 instead of fully developing a new language model, the significant time and effort that are typically expended in developing new language models can be saved, while still providing highly accurate recognition results. Because the words and phrases used in certain contexts are sometimes universal across many or all geographies, cultures and languages, the use of an estimated target language model 132 for a target language and context may lead to recognition results that are more accurate than results that are generated using a default language model, or using a language model that is not specific to any particular context, for the same, target language.

Figure 2:
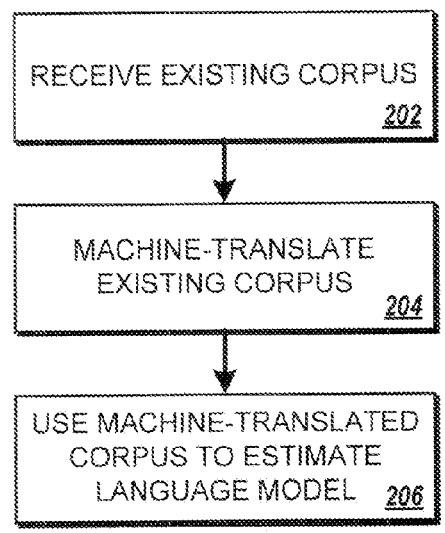
FIG. 2 is a flowchart of an example process.

FIG. 2 is a flowchart of an example process 200. Briefly, the process 200 includes receiving speech recognition results for a given language, translating the results into a different language, and estimating a language model for the different language based on the translation results.

During the early stages of development of a new language model, the performance of an ASR engine may suffer due to the lack of a sufficient context-specific corpus for a particular language. According to the process 200, a context-specific corpus may be generated based on speech recognition results or logged text data of an existing corpus from a different language for the same context, and the generated corpus may optionally be blended with other data sources for the target language (e.g., dictionaries), and may be used as a starting corpus to estimate the new context-specific language model. A new corpus that is generated using a corpus that is populated with words or phrases from a different language may be well suited for transcribing audio signals for contexts in which words or phrases used by users are universal or are fairly language-independent.

In more detail, when process 200 begins, speech recognition results associated with an existing corpus for a given language are received (202). The speech recognition results may be included in a context-specific corpus of words or phrases in the given language, such as words or phrases that have been previously submitted by previous users in a context that was the same as or similar to the target context. In some implementations, the existing corpus includes candidate transcriptions from previous speech recognition operations performed at an ASR engine, including speech recognition performed on utterances that were spoken by a particular user or group of users. The existing corpus may also include previous text data associated with the same, target context.

Referring ahead briefly, FIG. 3 is a diagram of an example corpus 302 and an example language model 304. The example corpus 302 may include all words or phrases that have been submitted by previous users, for a target context. The example corpus 302 may be populated, for example, by collecting actual speech recognition results associated with voice-recorded text messages for multiple users over time. For a different context, such as a search query context, a corpus may be populated by collecting actual search queries entered in online search applications. The example context-specific language model 304 is generated or estimated based on the example corpus 302.

The example context-specific language model 304 includes a probability of an occurrence of each word or phrase in the corpus 302. In other words, the example language model 304 that is generated based on the example corpus 302 of text messages provides an indication of the extent to which certain phrases and words are used in the context of user-submitted text messages.

An ASR engine may use the example language model 304 that includes a probability of an occurrence of a particular word or phrase in the corpus in order to transcribe utterances that are encoded in an audio signal. If an utterance that is phonetically transcribed as "I luv noo urk" is received at an ASR engine, the ASR engine may generate the candidate transcriptions "I love new work," "I love New York," or "I love Newark." If, as is illustrated in the example language model 304, the phrase "I love New York" occurs much more frequently than the phrases "I love new work" and "I love Newark," then the ASR engine may output the phrase "I love New York" as a candidate transcription, or may output the phrase "I love New York" as the candidate transcription that has a highest recognition confidence score.

Returning to FIG. 2, the received speech recognition results of the given language are translated into a different language (204). In some instances, the translation may be performed automatically using a hardware or software machine translation engine or module.

After the speech recognition results are translated into the different, target language, a target language model is estimated or otherwise generated for the same context and different language (206). The language model may include a probability of occurrence of each word or phrase in the speech recognition results.

In some instances, different phrase lengths may be counted in the speech recognition results. For example, a given language model may only include counts of single-word phrases so that when transcribing audio signals, the language model is only used to determine whether a particular word is more likely than other words for a given context.

Language models may also include counts of multiple word phrases. If a language model also includes a count of two-word phrases, for example, the language model may be used to determine the likelihood that certain two-word phrases are intended by a user over other less frequent two-word phrases. Accordingly, a language model for one language may be generated based on the translated results of a corpus of a different language.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims.

For example, the actions recited in the claims may be performed in a different order and still achieve desirable results.

What is claimed is:

1. A computer-implemented method performed by at least one processor, the method comprising:
   receiving audio input in a target language, and a target context of the audio input;
   determining that a target corpus that corresponds to the target language and the target context is unavailable;
   receiving logged speech recognition results that correspond to an existing corpus that is specific to a given language that differs from the target language, and to the same target context that corresponds to the received target language audio input and the logged speech recognition results;
   generating the target corpus that corresponds to the target language and the target context by machine-translating the logged speech recognition results corresponding to the given language to the target language; and
   estimating a context-specific language model that is specific to both the target language and the target context using the generated target corpus.

2. The method of claim 1, wherein estimating the context-specific language model comprises counting each occurrence of each distinctive word or phrase in the target corpus.

3. The method of claim 2, wherein estimating the context-specific language model comprises determining a relative frequency of occurrence of each distinctive word or phrase in the target corpus from among all distinctive words or phrases in the target corpus.

4. The method of claim 1, wherein the target context is associated with a particular application or application state, operating system, geographic location or region, or environmental or ambient characteristic.

5. The method of claim 1, wherein the target context is a text messaging context, an e-mail context, a search query context, a voice-dialing context, or a navigation context.

6. The method of claim 1, wherein generating the target corpus comprises filtering the speech recognition results, then machine-translating only the filtered speech recognition results.

7. The method of claim 6, wherein filtering the speech recognition results comprises filtering the speech recognition results that are associated with a speech recognition confidence score that is below a predefined threshold.

8. The method of claim 6, wherein filtering the speech recognition results comprises filtering the speech recognition results that represent abbreviations.

9. The method of claim 1, wherein generating the target corpus comprises machine-translating the speech recognition results of the existing corpus in real time as the speech recognition results are received.

10. A system comprising:
    one or more non-transitory computer-readable storage media storing data that represents an existing corpus;
    an automated speech recognition engine, executable on one or more processors having access to the computer-readable storage media, and operable to receive audio input in a target language, and a target context of the audio, and further operable to determine that a target corpus that corresponds to the target language and the target context is unavailable;
    a machine translation engine, executable on one or more processors having access to the computer-readable storage media, and operable to receive logged speech recognition results that correspond to an existing corpus that is specific for a given language that differs from the target language, and to the same target context that corresponds to the received target language audio input and the logged speech recognition results, and further operable to generate the target corpus that corresponds to the target language and the target context by machine-translating the logged speech recognition results corresponding to the given language to the target language, wherein results of the translation are stored in the computer-readable storage medium as the target corpus; and
    a language model generator, executable on one or more processors having access to the computer-readable storage media, and operable to estimate a context-specific language model that is specific to both the target language and the target context using the generated target corpus.

11. The system of claim 10, wherein the machine translation engine is further operable to translate logged text data of the existing corpus in the given language to the target language and include translation results of the logged text data in the target corpus.

12. The system of claim 10, wherein estimating the context-specific language model comprises determining a relative frequency of occurrence of each distinctive word or phrase in the target corpus from among all distinctive words or phrases in the target corpus.

13. The system of claim 10, wherein the target context is a text messaging context, an e-mail context, a search query context, a voice-dialing context, or a navigation context.

14. A non-transitory computer storage medium encoded with a computer program, the program comprising instructions that when executed by data processing apparatus cause the data processing apparatus to perform operations comprising:
    receiving audio input in a target language, and a target context of the audio input;
    determining that a target corpus that corresponds to the target language and the target context is unavailable;
    receiving logged speech recognition results that correspond to an existing corpus that is specific to a given language that differs from the target language, and to the same target context that corresponds to the received target language audio input and the logged speech recognition results;
    generating the target corpus that corresponds to the target language and the target context by machine-translating the logged speech recognition results corresponding to the given language to the target language; and
    estimating a context-specific language model that is specific to both the target language and the target context using the generated target corpus.

15. The computer storage medium of claim 14, wherein generating the target corpus comprises filtering the speech recognition results, then machine-translating only the filtered speech recognition results.

16. The computer storage medium of claim 15, wherein filtering the speech recognition results comprises filtering the speech recognition results that are associated with a speech recognition confidence score that is below a predefined threshold.

17. The computer storage medium of claim 14, wherein the target context is associated with a particular application or application state, operating system, geographic location or region, or environmental or ambient characteristic.

18. The computer storage medium of claim 14, wherein generating the target corpus further comprises including the machine-translated speech recognition results and an existing, partial corpus specific to the target language and the target context in the target corpus.

* * * * *

UNITED STATES PATENT AND TRADEMARK OFFICE
CERTIFICATE OF CORRECTION

| | | |
|---|---|---|
| PATENT NO. | : 8,260,615 B1 | Page 1 of 1 |
| APPLICATION NO. | : 13/093176 | |
| DATED | : September 4, 2012 | |
| INVENTOR(S) | : Kaisuke Nakajima and Brian Strope | |

It is certified that error appears in the above-identified patent and that said Letters Patent is hereby corrected as shown below:

Column 11, line 28, in claim 3, delete "corpusfrom" and insert -- corpus from --, therefor.

Signed and Sealed this
Thirteenth Day of November, 2012

David J. Kappos
*Director of the United States Patent and Trademark Office*